Feb. 21, 1939.　　　C. I. STANTON ET AL　　　2,147,679
ILLUMINATING SYSTEM
Filed Nov. 16, 1936　　　3 Sheets-Sheet 1

INVENTORS
CHARLES I. STANTON
BY EDGAR O. SEAQUIST
ATTORNEY

Feb. 21, 1939.   C. I. STANTON ET AL   2,147,679
ILLUMINATING SYSTEM
Filed Nov. 16, 1936   3 Sheets-Sheet 2

Inventors
CHARLES I. STANTON
EDGAR O. SEAQUIST
By
Attorney

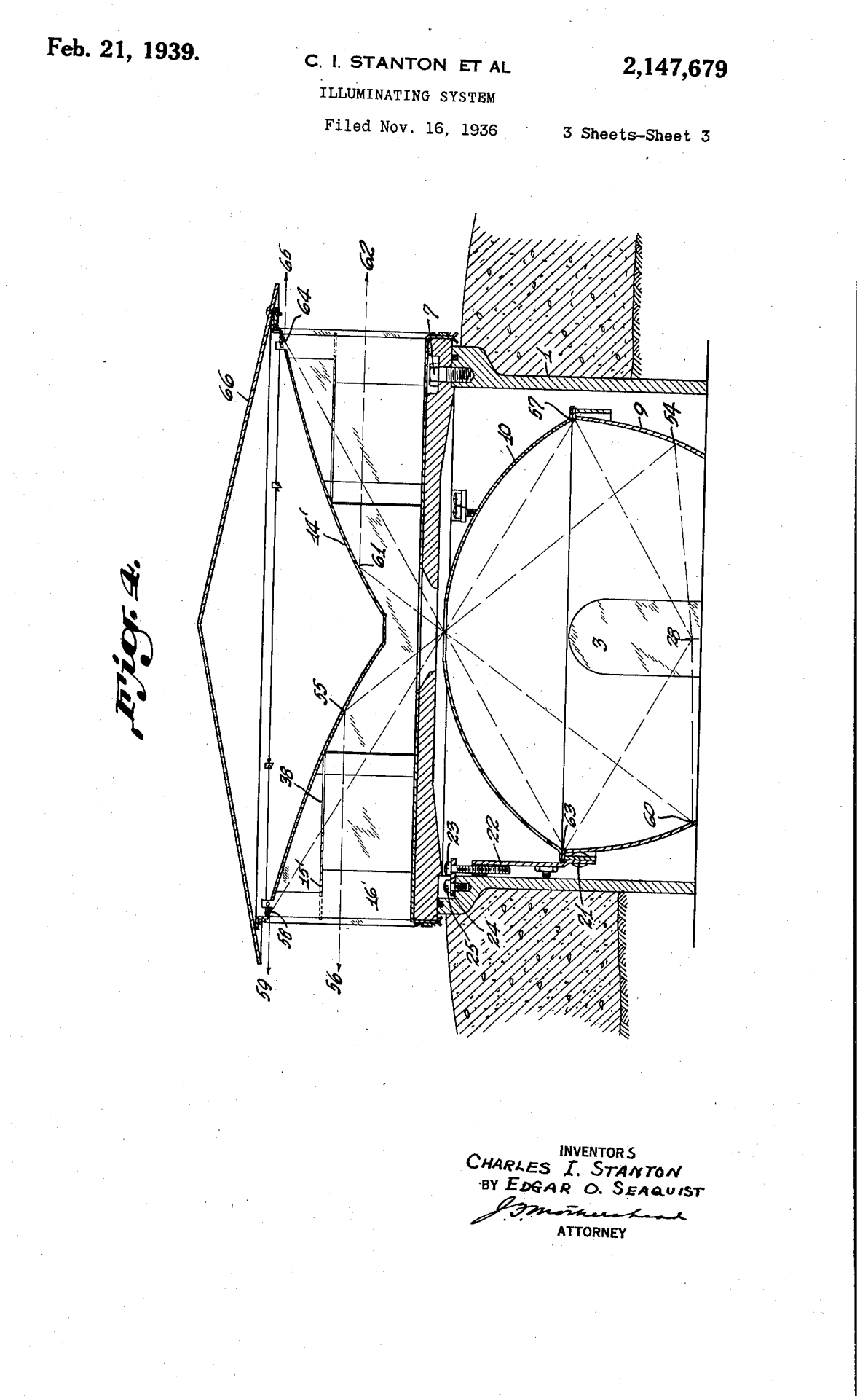

Feb. 21, 1939.   C. I. STANTON ET AL   2,147,679
ILLUMINATING SYSTEM
Filed Nov. 16, 1936   3 Sheets-Sheet 3

Fig. 4.

INVENTORS
CHARLES I. STANTON
BY EDGAR O. SEAQUIST
ATTORNEY

Patented Feb. 21, 1939

2,147,679

UNITED STATES PATENT OFFICE 2,147,679

ILLUMINATING SYSTEM

Charles I. Stanton and Edgar O. Seaquist, Washington, D. C., assignors to the Government of the United States of America, as represented by the Secretary of Commerce Application November 16, 1936, Serial No. 111,078

3 Claims. (Cl. 240—1.2)

(Granted under the act of March 3, 1883, as amended April 30, 1928; 370 O. G. 757)

The invention described may be manufactured and used by or for the Government for governmental purposes without the payment to us of any royalty thereon.

This invention relates in general to lighting systems and more particularly to systems for illuminating runways at airplane landing fields, or other flat surfaces.

The conventional landing area floodlight system employs one or more reflector or refractor floodlights disposed at elevated positions with respect to the terrain toward which the light rays are directed. This type of system is disadvantageous for several reasons. In the first place even in clear weather the illumination varies inversely as the square of the distance from the light source. Hence the luminous intensity of the light is of necessity extremely great in order to properly illuminate the entire area of a long and adequate landing strip. Secondly the airplane pilot is subjected to the glare inasmuch as he must at times face the light in landing or taking off. Moreover, in foggy or rainy weather with the floodlight unit mounted high above the ground necessary for advantage in illumination of the surface, the illuminated fog or rain tends to give the pilot a false impression as to his position above the ground. At best the conventional system produces glare and shadows that interfere with the pilot's clear vision.

It is therefore an object of this invention to provide a lighting system that will overcome the foregoing objections and properly and adequately illuminate the landing strip to be used, enable the pilot to land or take off without ever being forced to look directly into the light and which system will provide for a definite and considerable restriction of the height of the light rays above the actual surface of the landing strip.

In order to accomplish the above and other objects the invention contemplates the use of a plurality of floodlight units disposed at spaced points along the lengths of the landing strip. In order to confine the illumination to the ground surface and restrict the height of the light rays above the landing strips surface, the units are designed so that the light source is below the ground. The light is reflected upwardly and concentrated as it passes through a small outlet in the underground portion of the unit. Above the light outlet is a low reflecting system which is so designed as to reflect the light in rays, substantially all of which are nearly parallel with but slightly incline downward toward the ground. The part of the reflecting system disposed above the ground is of light weight and of easily destructible material which would not cause injury to the airplane in case the latter should collide with it. These units are placed in such a position with respect to the runway that the pilot need never look directly at the units as he watches the runway ahead of him in landing or taking off. In other words, the units may be placed either on both sides of or down the middle of the runway and in either case the pilot lands or takes off in a direction parallel with the series of units, rather than toward or away therefrom. The invention contemplates the use of different runways to correspond with prevailing wind conditions and the equipping of each of the runways with such system of floodlight units.

The invention is set forth with greater particularity in the following specification and appended claims, certain embodiments therein being illustrated in the accompanying drawings, in which:

Figure 4 is a view in vertical section through a modified form of floodlight unit providing for an area of reflected light throughout an arc of 360 degrees.

Figure 2:
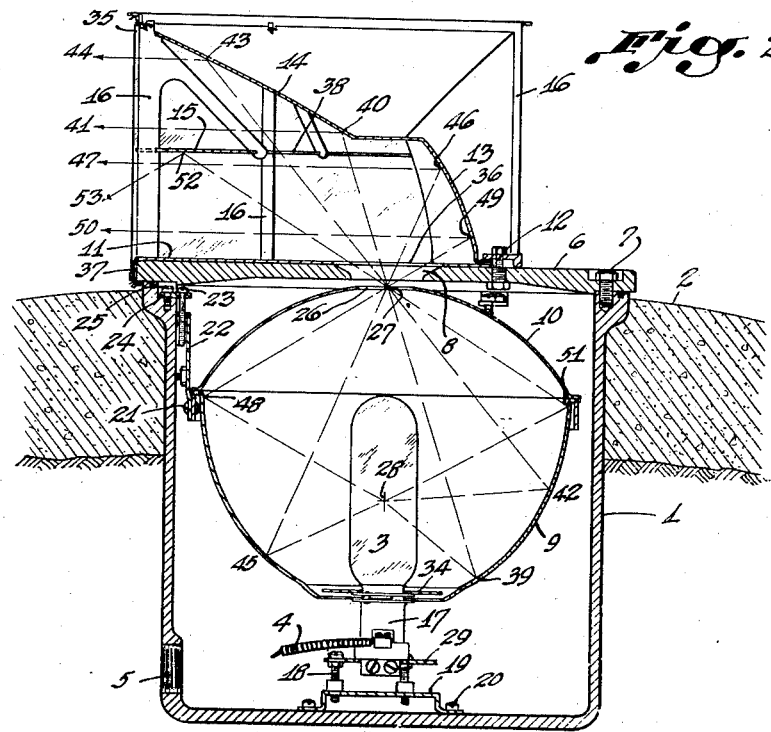
Figure 2 is a view in vertical section through the same unit taken along line 2—2 of Figure 1.

Referring more particularly to the drawings, in Figure 2, the device comprises a casing 1 arranged below the level of the runway surface 2. In this casing is suitably mounted an electric lamp 3 as a source of light. The electrical leads 4 may extend through an outlet 5. The casing has a cover 6 removably held in place by screw bolts 7, the cover being provided with a central aperture 8. The casing also has mounted therein reflector 9 for directing light rays upwardly from beneath the ground surface through the aperture 8.

In addition to the foregoing there is also provided a reflector assembly above the ground. This comprises a plate 11 bolted to the cover 6 at 12, and a cup reflector 13, another reflector 14 and flat annular stray light shield and reflector 15 supported on the plate 11 by the flat supports 16 set radially from the vertical axis. The reflector 14 is shown as an upward extension of the cup reflector 13 and it extends upwardly and outwardly. The under surface of reflector 14 is the reflecting surface and it may be a straight upward incline but the preferred form is to have it slightly concave. This reflector 14 is shown as having a horizontal cross section of approximately 240 degrees of a circle. This may be varied and the invention mainly contemplates different designs of cross sections of from 180 to 360 degrees. Thus, for purposes of reference, the cup-shaped reflector will be hereinafter referred to in the specification and claims as the cup reflector and the reflector 14 of Figures 1, 2 and 3, and the 360 degree reflector 14 will be referred to as cone reflectors.

Thus the major portion of the floodlight unit is beneath the runway surface. The light from the lamp is reflected upwardly through the aperture 8 in a proper direction so as to strike the reflecting surfaces of the reflector assembly above the ground in such a manner as to be reflected substantially horizontally over the landing strip surface but slightly downward with respect thereto. The upper reflector assembly is preferably made of thin sheet metal and covered with flexible transparent material 35 so that being relatively short in height it is also sufficiently destructible to provide for its collapse without injury to the airplane in case the latter should collide with it. The remainder of the unit is below the surface with the exception of the cover plate 6 which may be flush therewith and sufficiently strong to withstand the load of an airplane landing on it. Some suitable simple device may be employed to automatically close the aperture 8 in case of destruction of the upper reflector assembly.

The lamp socket 17 is supported so as to be vertically adjustable by means of screw bolts 18 on a bracket 19 secured to the bottom of the casing 1 by means of screws 20. The reflectors 9 and 10 are supported by the attachment of a flange of reflector 9 at 21 to brackets or hangers 22 screwthreaded to receive bolts 23 deriving their support from plates 24 secured at 25 to the casing 1. A turning of the bolts 23 thus effects a vertical adjustment of reflectors 9 and 10.

The reflector 10 is in reality a cover for reflector 9 and has a central aperture 26 coaxial with aperture 8 in the plate 6. The reflector 9 is ellipsoidal and the reflectors and lamp are so relatively vertically adjusted that the center 28 of the lamp filament coincides with the lower focal point of the reflector. Light rays emanating from the lamp that fall on the reflector 9 are reflected across the vertical axis at the upper focal point 27, which falls within the plane of the aperture 26 to form an inverted cone of light as indicated by the broken lines. This light is reflected horizontally by the upper reflector system by means which will later be described. By making the reflector 9 ellipsoidal it is possible to use a relatively small outlet 26 in the cover 10, thus providing greater protection to the lamp without using a complete glass cover. The reflector 10, which is a cover carried by the reflector 9, is spherical with its center of curvature at the lower focal point 28. The light from the higher regions of illumination from the lamp filament that does not strike the reflector 9 and which would be difficult to direct to the upper reflector assembly is reflected by the reflector 10 back to the filament, thus increasing the temperature of the filament and permitting the lamp to be operated on a voltage lower than that at which it is rated. The cover 6 is fit concentrically on to the casing 1 so that the vertical axis of the upper reflector assembly coincides with that of the casing 1. The vertical axis of the reflector 9 is made to coincide with the vertical axis of the casing by means of the adjustable hangers 22, previously described as a means of vertical adjustment of the reflectors 9 and 10. A flat reflector on the top flange of the socket 17 may be provided to reduce the radiant heat from the filament to the socket.

The center of the lamp filament is made to coincide with the focal point of the reflector 9 by the adjustable socket base 29 supported by the vertical adjustment screws 18 which may be reached by a long screw driver without removing the reflector 9.

Figure 1:
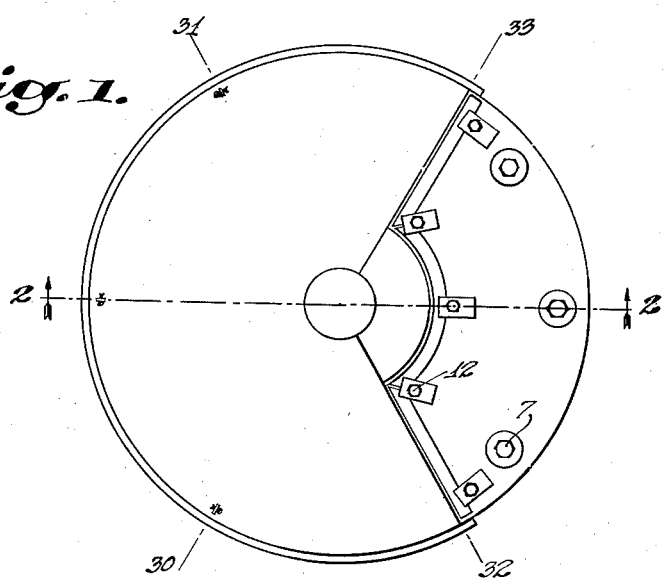
Figure 1 is a top plan view of one form of the floodlight unit providing for an area of reflected light throughout an arc of less than 360 degrees.
Figure 3:
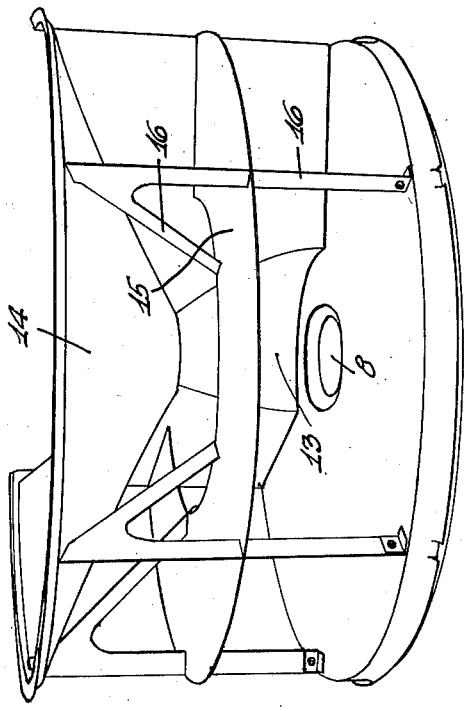
Figure 3 is a front view in perspective of the upper part of the reflector system shown in section in Figure 2.

As previously stated, the invention contemplates the reflection by the upper reflector system of light horizontally throughout an arc of 360 degrees or less. In the event that the floodlight units are placed either on one or both sides of the runway it would be unnecessary to provide for a 360 degree arc of illumination. In case they are placed on both sides they may be placed in staggered relationship. By way of example the embodiment shown in Figures 1, 2 and 3 provides for an illumination throughout an arc of 240 degrees. It is to be understood that that part of the floodlight unit below the plate 6 merely furnishes properly directed light upwardly through the aperture 8 to be directed horizontally transversely over the runway surface by the upper reflector assembly.

Referring again to Figures 1, 2 and 3, the upper focal point 27 of the ellipsoidal reflector 9 is also the focal point of the cup reflector 13 and the cone reflector 14. The reflecting surface of the cup reflector 13 is generated by revolving, about the vertical axis, a selected portion of a parabolic element between the vertex and the latus rectum. The reflecting surface of the cone reflector 14 is generated by revolving an experimentally determined element about the vertical axis.

Figure 1 shows a cup reflector that is generated by revolving an element about the vertical axis through 120° of azimuth and an element of the cone reflector that has been revolved about the vertical axis 240°. Thus a sector of light coming from the cup and cone reflectors through a horizontal angle of 120° from a direction indicated at 30 to one indicated at 31 may be directed symmetrically across the runway. On each side of this 120° sector there is a 60° sector of light from a direction indicated at 30 to one indicated at 32 and from the direction indicated at 31 to one indicated at 33 coming only from the cone reflector. The cup reflector may be increased to 180° of horizontal angle, in which case the cone reflector would also be 180°. Or the cup reflector may be reduced as the cone reflector is increased in horizontal angle. The limits for the cup reflector are from 180° to 0° as the limits of the cone reflector are from 180° to 360°.

A small portion of the light reflected from the ellipsoidal reflector 9 is directed to the bottom reflecting surface of a flat annular stray light shield 15 which reflects the light slightly downward along the landing strip surface. The horizontal angle of the stray light shield 15 is the same as that for the cone reflector 14. The flexible window 35 is suitably fastened along its top edge to the cone reflector and along its bottom edge to the flange 37 of mounting-plate 11, which has an aperture 36 coaxial with aperture 8 in the coverplate 6.

All parts of the above-surface reflector are readily and removably assembled on the mounting-plate as a unit. When set on cover plate 6 the vertical axis of the above-surface reflector assembly will coincide with that of the ellipsoidal reflector 9. The above-surface reflector assembly is fastened to the cover-plate with clamp-screws 12 behind the cone and cup reflectors and in front at the three louvre supports 16, by bending a small portion of the mounting-plate under the cover 6 so as to permit quick removal and replacement of the above-surface reflector assembly when damaged.

In the event that an arc of 360° illumination is desired, as may be the case where it is contemplated to place the floodlight units down the center of the wide runway and obtain light radially thereof in all directions from each unit, an arrangement such as that shown in Figure 4 may be employed. In this case the cup reflector 13 of Figures 1, 2 and 3 may be dispensed with and a cone reflector 14' such as shown in Figure 4 may be employed. This reflector 14' has the same reflector characteristics as those described in connection with reflector 14 of Figures 1, 2 and 3, but the effective angle is obviously greater, due to the elimination of the cup reflector. In other words, a horizontal cross-section of the cone reflector 14' is a circle instead of an arc of less than 360° as is the case of reflector 14. The cone reflector 14' conical roof-plate 66, and stray light shield 15' are supported on flat plates 16' set radially from the vertical axis. The under-surface light source and reflector system is the same as in Figures 1, 2 and 3. The flat stray light shields 15 and 15', supported by the flat plates 16 and 16', have circular cut-out portions 38 and 38', respectively.

Referring again to Figure 2, the light from the lamp filament center 28 striking point 39 of reflector 9 is directed upwardly to point 40 on the cone reflector 14 and thence substantially horizontally but slightly downward in the direction of the arrow 41. Light striking point 42 of reflector 9 is directed to point 43 of the reflector 14 and thence substantially horizontally but slightly downward in the direction of the arrow 44. Light striking point 45 of the reflector 9 is directed to point 46 on the cup reflector 13 and thence substantially horizontally but slightly downward in the direction of arrow 47. Light striking point 48 of the reflector 9 is directed to point 49 of the cup reflector 13 and thence substantially horizontally but slightly downward in the direction of the arrow 50. That small portion of light however that strikes point 51 is directed to point 52 of the annular stray light shield 15 and thence slightly downward, and not upward, in the direction of the arrow 53.

In Figure 4 the light from the lamp filament center 28 striking point 54 of the ellipsoidal reflector 9 is directed to the point 55 of the cone reflector 14' and thence substantially horizontally but slightly downward in the direction of the arrow 56. Light striking point 57 of the reflector 9 is directed to a point 58 of the reflector 14' and thence substantially horizontally but slightly downward in the direction of the arrow 59. Light striking point 60 of the reflector 9 is directed to point 61 of the reflector 14' and thence substantially horizontally cut slightly downward in the direction of the arrow 62. Light striking point 63 of the reflector 9 is directed to point 64 on the reflector 14' and thence substantially horizontally but slightly downward in the direction of the arrow 65.

From the foregoing it will be seen that there has been provided not only a novel and improved system of airport illumination but an improved floodlight unit itself wherein the major portion of the lighting system is below the landing strip surface and is thus safe against damaging and the above-surface part of the unit is easily installed and sufficiently destructible to obviate damage to an airplane striking it. Moreover, the reflected light, being small in vertical height above the landing strip surface and directed transversely throughout the length of the landing strip, gives the pilot adequate illumination of the landing strip without the necessity of looking directly into the light and without the usual attending glare, shadows and unnecessary and dangerous illumination at an unnecessary and undesired height above the landing strip surface.

We claim:

1. In an illuminating system, an electric lamp, reflector means for directing substantially all of the light rays emanating from said lamp upward to a focus and thence in planes substantially parallel with the surface to be illuminated and for predetermining the height and arc of said reflected light with respect to the surface to be illuminated, said means comprising an ellipsoidal reflector, said lamp and ellipsoidal reflector being relatively adjustable to bring the lower focal point of the latter into coincidence with the center of the filament of said lamp and a reflector assembly for receiving the rays from said ellopsoidal reflector and so arranged as to reflect substantially all of said rays in a plane substantially parallel with the surface to be illuminated, said reflector assembly comprising a cone reflector whose focal point coincides with the upper focal point of said ellipsoidal reflector, and a cup shaped reflector whose focal point coincides with that of said cone reflector for collecting rays reflected thereto by said ellipsoidal reflector and out of reach of said cone reflector for directing the rays in planes substantially parallel with the surface to be illuminated.

2. In an illuminating system, an electric lamp, reflector means for directing substantially all of the light rays emanating from said lamp to a focus and thence in planes substantially parallel with the surface to be illuminated and for predetermining the height and arc of said reflected light with respect to the surface to be illuminated, said means comprising an ellipsoidal reflector, said ellipsoidal reflector having a spherical reflector cover provided with a centrally disposed light outlet, said ellipsoidal reflector and cover being adjustable with respect to said lamp to bring the focal point of said ellipsoidal reflector, the center of said light outlet and center of curvature of said reflector cover into coincidence with the center of the filament of said lamp, a reflector assembly comprising a cone reflector and a cup-shaped reflector the focal points of each being coincident with the upper focal point of said ellipsoidal reflector lying in the plane of said light outlet and a reflecting light shield so disposed as to reflect the rays directed thereto by said ellipsoidal reflector through said light outlet not directed toward said cone and cup reflectors, in a direction angularly downwardly toward the surface to be illuminated.

3. In a lighting unit, an ellipsoidal reflector, a spherical reflector, a cone reflector and a cup-shaped reflector, a source of light so adjustable as to place the center of said light source at the main focal point of said ellipsoidal reflector, said ellipsoidal reflector having a centrally located aperture covered by said spherical reflector, said spherical reflector having a center of curvature at said main focal point and a radius of curvature equal to the distance between the man and conjugate focal points of said ellipsoidal reflector, said spherical reflector having an aperture at the axis large enough to permit all the light rays reflected from said ellipsoidal reflector to cross the axis in the region of the conjugate focal point and then be reflected symmetrically in a predetermined horizontal arc by said cone reflector and said cup reflector in a direction substantially at right angles to the common axis onto the surface to be illuminated, the focal points of said cone and said cup-shaped reflector being in coincidence with the conjugate focal point of said ellipsoidal reflector.

CHARLES I. STANTON.
EDGAR O. SEAQUIST.